E. H. COTTRELL.
NEWSPAPER.
APPLICATION FILED JAN. 25, 1915.

1,341,634.

Patented June 1, 1920.
2 SHEETS—SHEET 1.

E. H. COTTRELL.
NEWSPAPER.
APPLICATION FILED JAN. 25, 1915.

1,341,684.

Patented June 1, 1920.

UNITED STATES PATENT OFFICE.

EDGAR H. COTTRELL, OF WESTERLY, RHODE ISLAND.

NEWSPAPER.

1,341,634.  Specification of Letters Patent.  Patented June 1, 1920.

Application filed January 25, 1915. Serial No. 4,230.

*To all whom it may concern:*

Be it known that I, EDGAR H. COTTRELL, a citizen of the United States, and resident of Westerly, in the county of Washington and State of Rhode Island, have invented a new and useful Improvement in Newspapers, of which the following is a specification.

In newspapers as usually produced where the leaves bearing the printed pages are approximately from sixteen to eighteen inches wide and from twenty-one to twenty-three inches long, it is well known that because of the very large size of the leaves, the location of the fold and the usual poor quality of paper, it is extremely difficult to hold the newspaper in a proper position for perusal and it is also difficult to turn the leaves over without wrinkling and tearing the paper and without using an undue amount of room, which latter is very undesirable where crowded conditions prevail as in public conveyances, etc.

The object of my invention is to overcome the defects and disadvantages above enumerated, by producing a newspaper in which the sheets are folded transversely to the columns of printed matter so that the newspaper may be very easily held in a convenient position for reading and permitting the very ready turning of the leaves, the newspaper at all times being kept within a reasonable size for easy perusal and handling.

A further object is to so arrange the printed matter that each side of each sheet will bear two printed pages, the two printed pages on the front side of the front sheet reading in opposite directions, the two printed pages on the back side of the back sheet reading in opposite directions and the two printed pages on each of the remaining sides of all of the sheets reading in the same direction.

Practical embodiments of my invention are represented in the accompanying drawings which illustrate a twelve-page newspaper having its sheets printed, assembled and folded according to my invention.

The three sheets are denoted by $a$, $b$ and $c$, each of which sheets is provided with two printed pages on each side thereof, the pages on the front side of the front sheet reading in opposite directions, the pages on the back side of the back sheet reading in opposite directions, and the pages on each of the remaining sides of all of the sheets reading in the same direction.

The sheets are folded together transversely to the columns of reading matter along a line between the printed pages and are preferably secured together along said fold line.

In the embodiment of a twelve-page newspaper printed and arranged as in Figs. 1 to 6 inclusive, the front sides of the sheets $a$, $b$ and $c$, contain the printed pages 1 and 7, 2 and 6, 3 and 5, and the back sides of the said sheets contain the printed pages 10 and 4, 11 and 9, 12 and 8.

Figure 1:
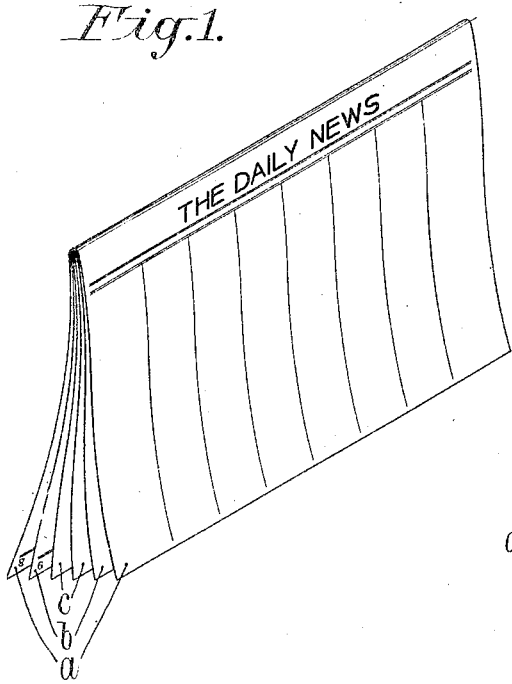
Figure 1 is a front view in perspective of a newspaper printed and folded according to one embodiment of my invention.
Figure 2:
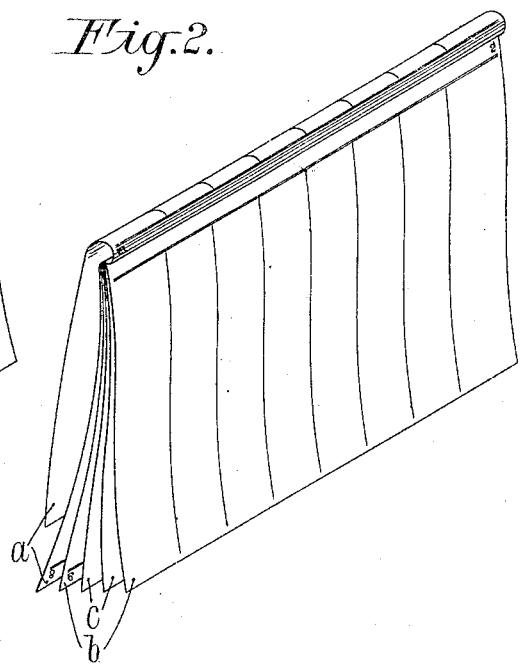
Fig. 2 is a similar view with the first leaf turned over.
Figure 3:
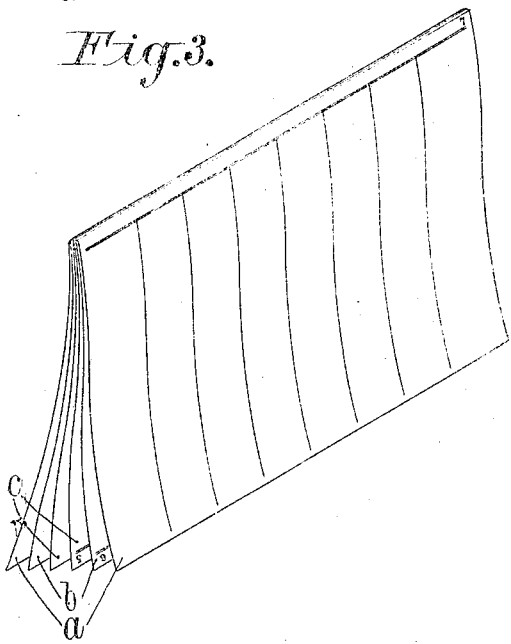
Fig. 3 is a back view in perspective.
Figure 4:
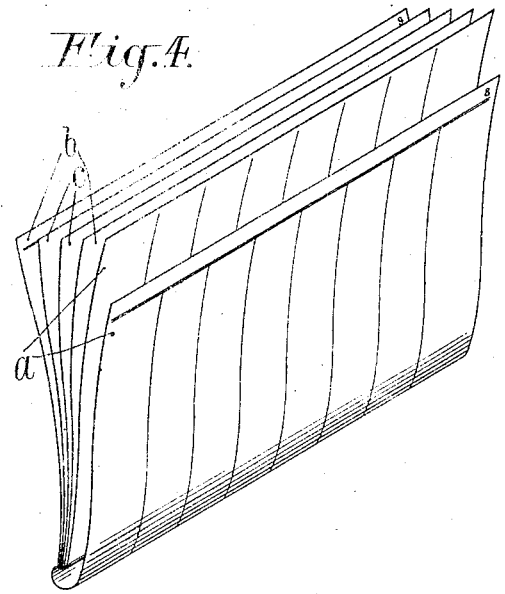
Fig. 4 is a view in perspective with the back leaf turned over and the newspaper inverted.
Figure 5:
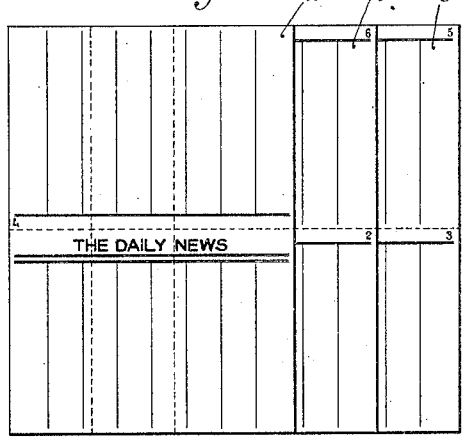
Figs. 5 and 6 are respectively front and back views on a smaller scale of the embodiment shown in Figs. 1 to 4 inclusive, with the sheets unfolded and partly separated to show more clearly the page arrangement.
Figure 6:
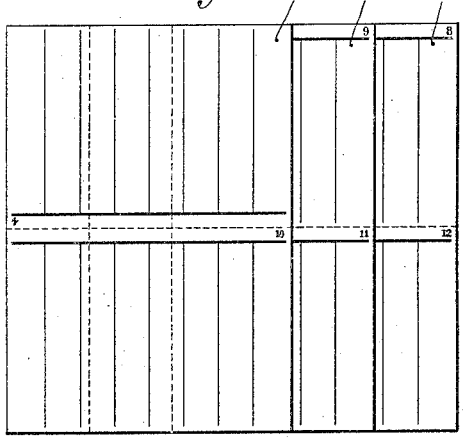
Figure 7:
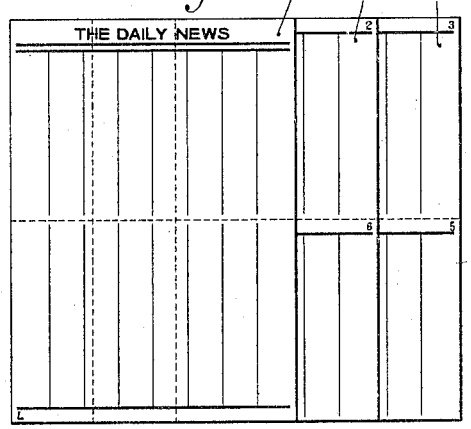
Figs. 7 and 8 are similar views of a second embodiment.
Figure 8:
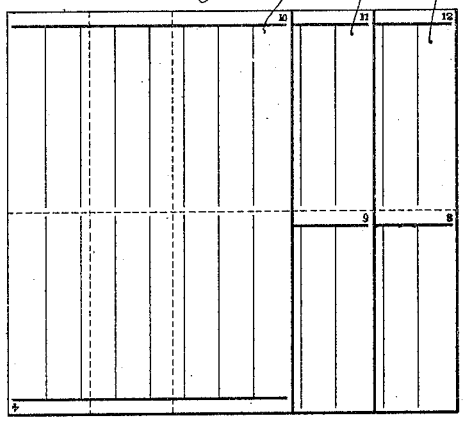

In the embodiment shown in Figs. 7 and 8, the front sides of the sheets $a$, $b$ and $c$ contain the printed pages 1 and 7, 2 and 6, 3 and 5, and the back sides of said sheets contain the printed pages 10 and 4, 11 and 9, 12 and 8.

In the embodiment illustrated in Figs. 1 to 6 inclusive, the heading for the first page starts at the fold line on the front side of the front sheet, while in the other embodiment the heading for the first page starts at the upper edge of the front side of the front sheet.

A newspaper produced according to this invention may be perused very conveniently and may be kept at all times within a reasonable lateral compass and may be readily perused by turning the leaves over so as to permit the leaves to fall by gravity into position to be easily grasped by the hands of the reader without any danger of wrinkling or tearing the newspaper.

By the term "newspaper" I wish to include all large products of an equivalent nature where the size of the product renders the same open to the disadvantages and defects enumerated, if they were printed or folded as heretofore and in which such disadvantages and defects would be remedied by the printing and folding of the same in a manner substantially as herein shown and described.

It is obvious that various embodiments herein shown and described are only a few of many embodiments which would be included by my invention; hence I do not wish to limit myself to the structures herein shown, but

What I claim is:

A newspaper comprising a plurality of sheets, each sheet having two printed pages on each side thereof, and a fold line between the pages, the columns of printed matter running at right angles to the fold line, the two printed pages on the front side of the front sheet when unfolded reading in opposite directions with relation to the fold line and the two printed pages on the back side of the back sheet when unfolded reading in opposite directions with relation to the fold line, and the two printed pages on each of the remaining sides of all of the sheets when unfolded reading in the same direction.

In testimony, that I claim the foregoing as my invention, I have signed my name in presence of two witnesses, this tenth day of November, 1914.

EDGAR H. COTTRELL.

Witnesses:
F. GEORGE BARRY,
C. S. SUNDGREN.